US 6,741,255 B1

(12) United States Patent
Furlani et al.

(10) Patent No.: US 6,741,255 B1
(45) Date of Patent: *May 25, 2004

(54) METHOD, APPARATUS AND COMPUTER PROGRAM PRODUCT FOR USING DEFERRED EXECUTION FOR A TILING PULL MODEL IN A TILED IMAGE PROCESSING ARCHITECTURE

(75) Inventors: John L. Furlani, Palo Alto, CA (US); Alexandra R. Ohlson, Palo Alto, CA (US); Richard T. Inman, Raleigh, NC (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,091

(22) Filed: Aug. 14, 1997

(51) Int. Cl.[7] .............................................. G06F 13/00
(52) U.S. Cl. ...................... 345/537; 345/503; 345/522; 345/561; 345/619; 382/276; 382/302; 382/305; 382/308
(58) Field of Search .................... 345/418, 433–439, 345/441, 501–506, 522, 523, 524, 507, 509, 203, 581, 619, 620, 629, 642, 643, 646, 647, 648, 649, 660, 672, 520, 531, 537, 545, 561; 382/276, 302, 303, 305, 307, 308

(56) References Cited

U.S. PATENT DOCUMENTS

| 5,485,568 | A | * | 1/1996 | Venable et al. ............. 707/500 |
| 5,490,246 | A | * | 2/1996 | Brotsky et al. ............. 345/342 |
| 5,613,051 | A | * | 3/1997 | Iodice et al. ................ 345/428 |
| 5,631,974 | A | * | 5/1997 | Lau-Kee et al. ............ 382/132 |
| 5,808,625 | A | * | 9/1998 | Picott et al. ................ 345/440 |
| RE36,145 | E | * | 3/1999 | DeAguiar et al. .......... 345/511 |
| 5,907,640 | A | * | 5/1999 | Delean ....................... 382/276 |

OTHER PUBLICATIONS

Aho, A.V., et al., in *Compilers: Principles, Techniques, and Tools*, Addison–Wesley Publishing Co., Reading, MA (1988).

* cited by examiner

*Primary Examiner*—Ulka J. Chauhan
(74) *Attorney, Agent, or Firm*—Robert C. Kowert; Meyertons, Hood, Kivlin, Kowert & Goetzel, P.C.

(57) ABSTRACT

Apparatus, methods, systems and computer program products are disclosed that optimize the application of deferred image operations on a tiled source image. The invention dynamically creates a data structure (such as a directed acyclic graph (DAG)) representing the operations performed on various instances of one or more images to create a final image. The invention analyzes the data structure to determine which source image tiles are needed when the actual image data comprising the final image is required. Each of these tiles are then separately processed by all of the deferred operations to create the final image data. This approach reduces the number of times a tile is read into memory for processing and improves the performance of deferred image operations on a tiled source image.

21 Claims, 13 Drawing Sheets

METHOD, APPARATUS AND COMPUTER PROGRAM PRODUCT FOR USING DEFERRED EXECUTION FOR A TILING PULL MODEL IN A TILED IMAGE PROCESSING ARCHITECTURE

BACKGROUND OF THE INVENTION

1. Field of the Invention

This invention relates to the field of image processing techniques. Specifically, this invention is a method, apparatus, system, and computer program product for implementing a tiled image processing architecture that uses deferred execution to implement a tiling pull model.

2. Background

Computer applications often use digitized video, computer generated, or scanned images. These applications are often directed towards document imaging, multimedia presentations and other similar needs.

For performance reasons, these applications are often programmed using minimal library support because of the overheads related to generalized image operations that affect performance of generalized image libraries. The images operated on by these application are often very large—typically from tens of megabytes to more than a gigabyte. Often the size of the image is larger than the memory available to store the image. To process such a large image, the image is generally "tiled" so that only a portion (a tile) of the image is in memory at a particular time. One high overhead operation of a traditional library results from sequentially applying a series of imaging operations to an image. In this situation, each tile of the source image is read into memory and operated on by the first imaging operation. Then, each tile of the image is again read into memory and operated on by the second imaging operation. Thus, each tile of the image is read into memory, modified, written back to filestorage for each deferred operation. This results in a large number of filestorage accesses each taking significant time when compared to the time required to operate on a single tile.

Compiler technology exists that optimizes sequences of computer operations when compiling a program. A general discussion of optimizing compilers and the related techniques used can be found in *Compilers: Principles, Techniques and Tools* by Alfred V. Aho, Ravi Sethi and Jeffrey D. Ullman, Addison-Wesley Publishing Co., 1988, ISBN 0-201-10088-6, in particular pages 546–567 and 598–602. It would be advantageous to apply these optimization techniques, with modifications, to determine which tiles of an image need to be processed, and then apply the imaging operations sequentially to each of those tiles in turn. This approach reduces the number of filesystem accesses required to realize the image.

SUMMARY OF THE INVENTION

The present invention improves the performance of a sequence of imaging operations on a tiled source image by sequentially applying the imaging operations to each relevant tile in the source image. One aspect of the invention is a computer controlled method for applying a plurality of sequential imaging operations to a tiled image. The method is performed by a computer that has a memory. The tiled image contains a plurality of tiles one of which is a target tile. The plurality of sequential imaging operations that operate on the tiled image terminates with a result producing imaging operation. This method captures the plurality of sequential imaging operations that are to be performed on the tiled image. It also determines the target tile in the tiled image that is to be operated on by the plurality of sequential imaging operations. Then the method applies the plurality of sequential imaging operations sequentially on the target tile to realize a portion of a destination image.

Another aspect of the invention is an apparatus, having a central processing unit (CPU) and a memory coupled to said CPU, for applying a plurality of sequential imaging operations to a tiled image. The tiled image has a plurality of tiles including a target tile. The plurality of sequential imaging operations terminate with a result producing imaging operation. The apparatus includes an operation capture mechanism that is configured to capture the plurality of sequential imaging operations to be performed on the tiled image. The operation capture mechanism also detects the result producing imaging operation. Also included with the apparatus is a target tile determination mechanism that is configured to determine the target tile operated on by the plurality of sequential imaging operations. the target tile determination mechanism is responsive to detection of said result producing imaging operation by the operation capture mechanism. Additionally, an imaging mechanism that is configured to apply the plurality of sequential imaging operations sequentially on the target tile to realize a portion of a destination image.

In yet another aspect of the invention a computer system is disclosed, including a central processing unit coupled to a memory, for applying a plurality of sequential imaging operations to a tiled image. The tiled image has a plurality of tiles including a target tile. The plurality of sequential imaging operations terminate with a result producing imaging operation. The system includes an operation capture mechanism that is configured to capture the plurality of sequential imaging operations to be performed on the tiled image. The operation capture mechanism also detects the result producing imaging operation. Also included with the system is a target tile determination mechanism that is configured to determine the target tile operated on by the plurality of sequential imaging operations. The target tile determination mechanism is responsive to detection of said result producing imaging operation by the operation capture mechanism. Additionally, an imaging mechanism that is configured to apply the plurality of sequential imaging operations sequentially on the target tile to realize a portion of a destination image.

Yet a further aspect of the invention is a computer program product embedded on a computer usable medium for causing a computer to apply a plurality of sequential imaging operations to a tiled image. When executed on a computer, the computer readable code causes a computer to effect an operation capture mechanism, a target tile determination mechanism, and an imaging mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

Figure 1:
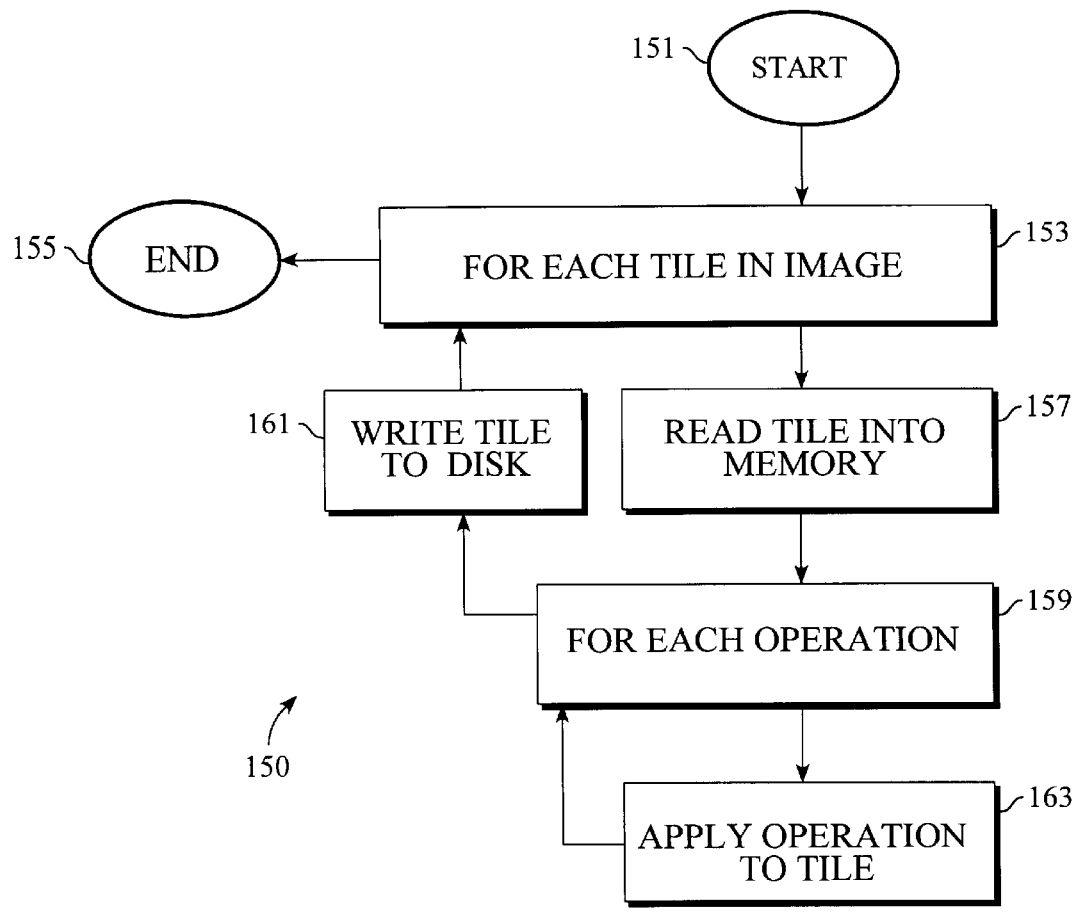
FIG. 1 illustrates a 'deferred image operation' process for modifying an image in accordance with a preferred embodiment.

The following 'notations and nomenclature' are provided to assist in the understanding of the present invention and the preferred embodiments thereof.

Deferred processing—Deferred processing enables a sequence of image operations on one or more images to be stored until a realized image is required. Storing information about the images and the image operations applied to the images allows an image processing library to optimize operations on the images.

Destination image—The destination image is a realized image created by performing the operations represented by the DAG on the source image(s). See intermediate image and source image.

Image data—The image data is the data that describes the image. Image data is a collection of data that represents the color and intensity of a collection of pixels. Image data can be compressed.

Image instance—An image instance is represented by an op-queue entry attached to the image representation's op-queue. Thus, one image representation can be used to represent multiple instances of the represented image. Each image instance is dependent on the order that the node operations are applied to the image representation.

Image processing library—An image processing library is a collection of programming code and data structures that are used to provide services to an application program for performing operations on images.

Image representation—An image representation is a data structure within the DAG that provides information about the image. The image representation does not contain portions of the realized image, but does contain tile information and also contains the op-queue.

Intermediate image—An intermediate image is a realized image that is generally created prior to the generation of the destination image. Thus, an intermediate destination image can be created by a first node. This intermediate destination image (with respect to the first node) can be an intermediate source image for a second node that operates on the results of the first node. The last intermediate destination image is the same as the destination image. The first intermediate source image is the same as the source image. One skilled in the art will understand that, except for the source image and the destination image, the intermediate image need not be fully populated with tiles. Thus, the memory impact of the intermediate image can be limited to that of a single tile.

Node—A node is a data structure in a directed acyclic graph (DAG) that represents an operation on one or more source image representation(s) that results in a destination image representation. The nodes in the DAG are connected to each other. Each node contains pointers to image representations.

Op-queue—The op-queue is a data structure that contains op-queue entries that each represent an image instance of the image representation that contains it.

Pointer—A value used to access a node, op-queue entry or image representation. One skilled in the art will understand that "pointer" includes, without limitation, a memory address to, or a value used to calculate the address to the information of interest.

Realized image—A realized image contains image data as compared to an image representation that does not. Thus, intermediate images (including the source image and the destination image) are realized images. Realized images can contain unwieldy large amounts of image data. Thus a realized image is generally tiled so that the realized image can be operated on in sections (by tile) instead of on its entirety.

Result producing imaging operation—A result producing imaging operation includes capturing an image operation that requires that an image be realized, or detecting an external condition that requires an image to be realized (for example, if the user actually wants to view the image).

Source image—The source image is a realized image that is operated on by the deferred operations represented by the DAG to create a destination image. See intermediate image and destination image.

Target tile—A target tile is a tile from the source image that is operated on by the deferred image operations. One aspect of the invention is to determine which of the source image tiles are used by the deferred operations to realize image data that represents an area in the destination image.

Tile—A tile contains image data. Generally, a realized image is composed of multiple tiles.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

Deferred processing of image operations remembers a sequence of image operations that are to be applied to one or more images when a realized image is required. Conceptually the invention operates as illustrated in FIG. 1 wherein a deferred image process 150 initiates at a 'start' terminal 151 and continues to an 'iterate tile' procedure 153. The 'iterate tile' procedure 153 iterates over each tile in the source image. When all the tiles have been iterated, the deferred image process 150 completes through an 'end' terminal 155. As each tile is iterated by the 'iterate tile' procedure 153 the tile is read into memory by a 'read tile into memory' procedure 157. Once the tile is in memory it is operated on by the deferred operations. Each deferred operation is iterated by an 'iterate operation' procedure 159. Once all the deferred operations have been applied to the tile, the deferred image process 150 continues to a 'write tile to disk' procedure 161 that writes the modified tile back to disk—thus freeing memory for processing another tile iterated by the 'iterate tile' procedure 153. Each operation iterated by the 'iterate operation' procedure 159 is applied to the tile by an 'apply operation to tile' procedure 163. This approach greatly reduces the number of file storage accesses needed to process the image.

Another way to improve performance of the deferred image process 150 is to determine which tiles from the source image(s) are needed to generate a destination image tile and only apply the operations to those source image tiles.

Storing information about the images and the image operations applied to the images allows the image processing library to optimize its performance when applying the deferred operations to the images. One skilled in the art will understand that the invention can be practiced outside the realm of image processing libraries and can be applied to any field that is benefited by optimizing disk accesses based on operations applied to disk resident data.

The invention defers execution of image operations and specifically identifies which tiles of one or more source images must be brought into memory. The deferred operations are sequentially applied to each of these tiles instead of applying all of the deferred operations sequentially to each image. Thus, once a tile is brought into memory the deferred operations are applied to that tile. This improves image processing time because of the resulting reduction in filesystem accesses.

A preferred embodiment uses a modified directed acyclic graph (DAG) to represent the images and the operations applied to these images. One skilled in the art will understand that data structures other than a DAG can be used with similar results. The DAG is constructed by the imaging library as the library captures a series of imaging operations directed to one or more tiled source images. When a result producing imaging operation occurs, the invention analyzes the DAG to determine which source image tile(s) will be the target of the captured imaging operations. These tiles are brought into memory and sequentially operated on by each of the captured imaging operations to create the realized image. The portions of the DAG related to the realized image can be destroyed once the realized image is created.

Figure 2:
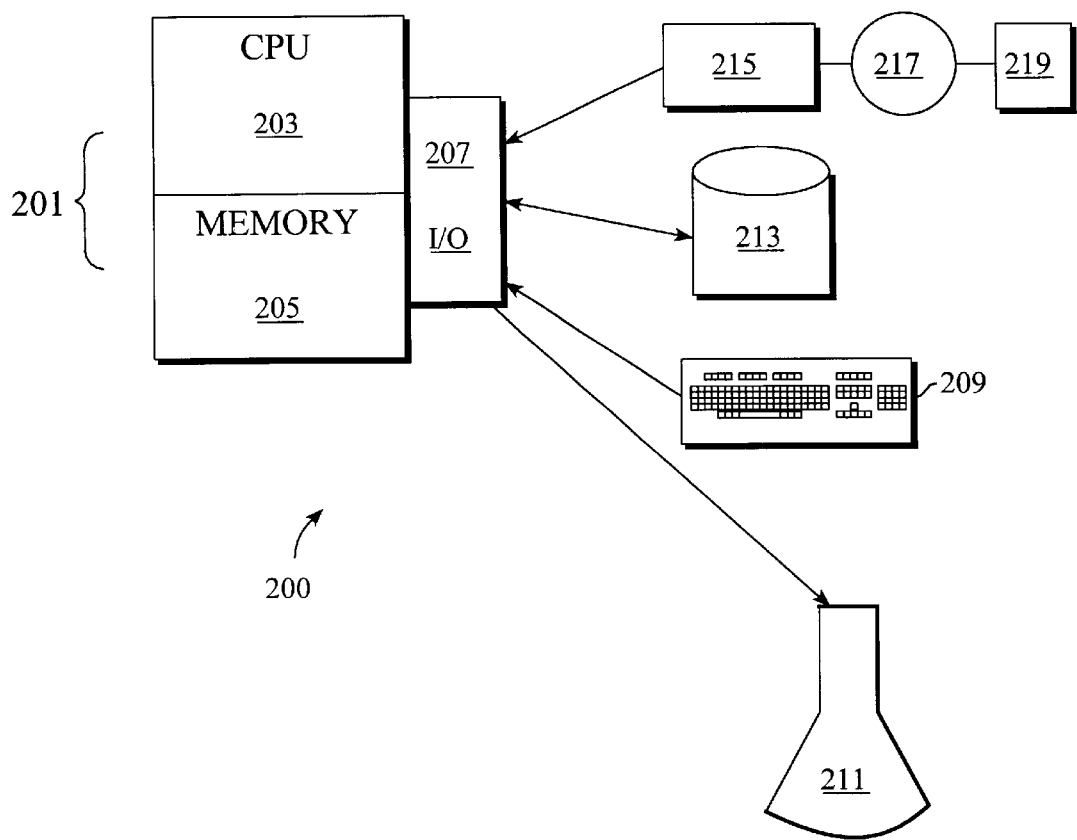
FIG. 2 illustrates a computer system capable of using the invention in accordance with a preferred embodiment.

The invention uses a computer. Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217, and the disk storage unit 213 comprise a filestorage mechanism. Such a computer system is capable of executing applications that embody the invention.

A preferred embodiment uses a modified DAG as the data structure used to optimize the imaging operations on the images. A subsequently described process creates a DAG similar to the ones described by FIG. 4A through FIG. 4C. One of the aspects of the modified DAG is the operation queue.

Figure 3:
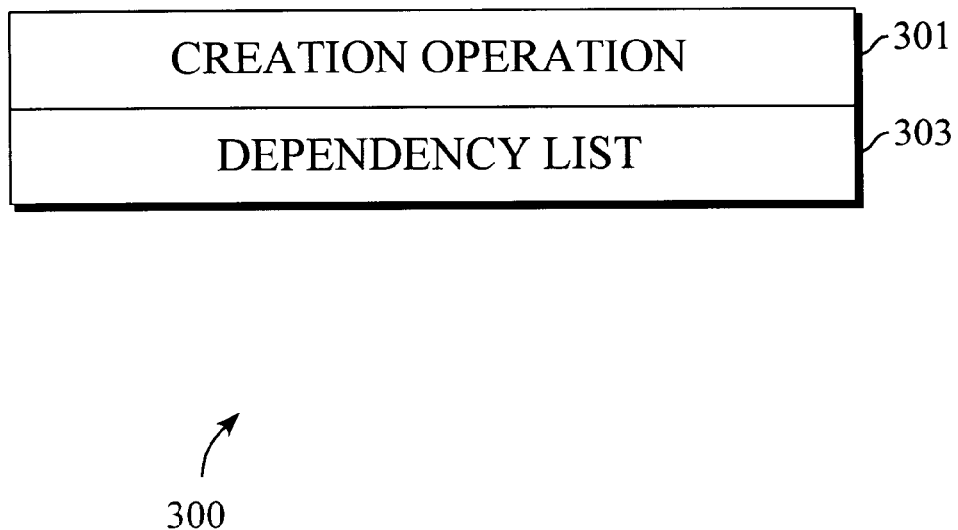
FIG. 3 illustrates a data structure used for an op-queue entry in accordance with a preferred embodiment.

FIG. 3 illustrates an operation queue (op-queue) entry used to represent an image instance of an image representation. A 'creation operation' field 301 points to the node in the data structure that represents the operation that created this image instance of the image representation. A 'dependency list' field 303 contains a list of pointers to nodes in the data structure that depend on the results of the image representation created by the operation pointed to by the contents of the 'creation operation' field 301. Each image representation has at least one image op-queue entry 300. An image representation can contain multiple image instances each representing the results of a different operation. One skilled in the art will understand that the 'creation operation' field 301 and/or the 'dependency list' field 303 may be empty. One skilled in the art will understand that the image op-queue entry 300 may contain other information related to the image instance.

Figure 4A:
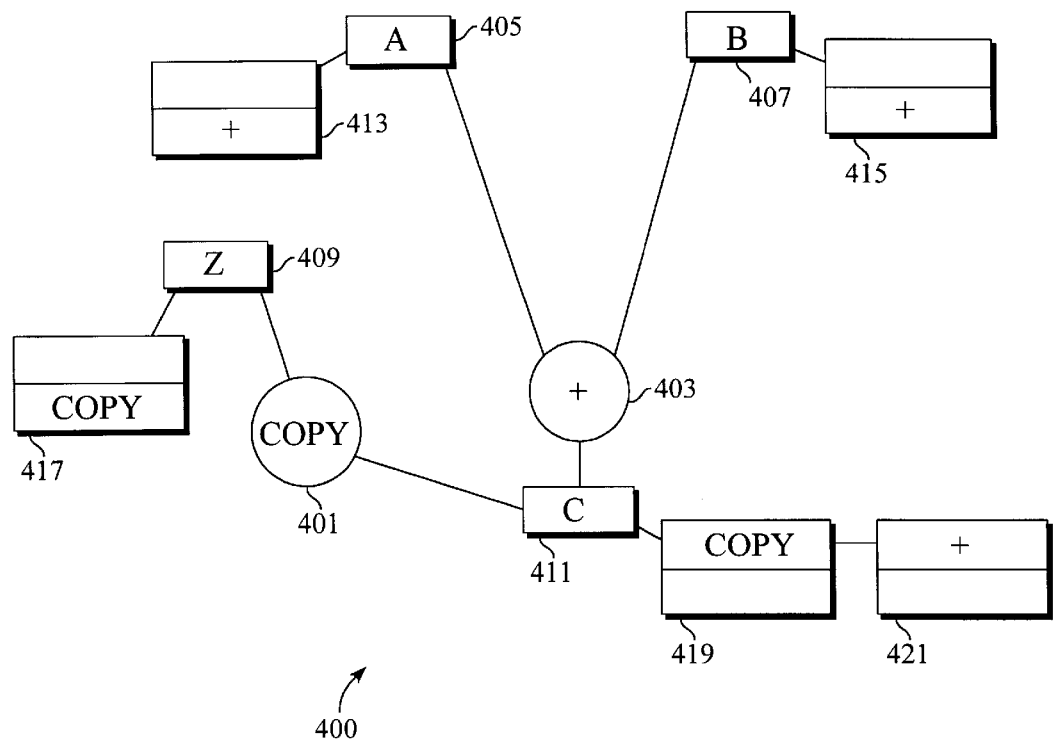
FIG. 4A illustrates a DAG structure used in accordance with a preferred embodiment.

FIG. 4A illustrates a directed acyclic graph (DAG) structure 400 that represents a sequence of image operations applied to one or more tiled images that define a realized image. These image operations are represented by a 'copy operation' node 401 and an 'addition operation' node 403. These operations are appropriately applied to an 'A image' representation 405, a 'B image' representation 407, a 'Z image' representation 409 and a 'C image' representation 411. The 'A image' representation 405 points to an 'A image' representation op-queue entry 413. The 'B image' representation 407 points to a 'B image' op-queue entry 415. The 'Z image' representation 409 points to a 'Z image' op-queue entry 417. The 'C image' representation 411 points to a 'first C image' op-queue entry 419 that, in turn, points to a 'second C image' op-queue entry 421 -each op-queue entry representing an image instance. One skilled in the art will understand that the term "points to" implies some means of accessing the op-queue entry whether by using pointers, indexes into an array or other well known techniques. Further, one skilled in the art will understand that the nodes and image representations in the DAG represent realized images and operations applied to the realized images. Each node has one or more source image representations and one destination image representation. In addition, each node represents an operation that is applied to one or more realized image instance(s) to realize a destination image. Each image representation represents an image that can be realized.

The data making up a tile of an image represented by an image representation is not realized (generated or read into memory) until a result producing imaging operation occurs.

The interpretation of FIG. 4A is now provided. The 'copy operation' node 401 is applied to the 'Z image' representation 409 to copy some, perhaps all, of the image data represented by the 'Z image' representation 409 into memory represented by the 'C image' representation 411. The 'Z image' representation 409 points to the 'Z image' op-queue entry 417. The 'Z image' op-queue entry 417 specifies that the 'Z image' representation 409 represents an original source image and not one created by an operation captured to create the DAG 400. This is indicated by the lack of a pointer in the 'creation operation' field of the 'Z image' op-queue entry 417. This image instance is used by the 'copy operation' node 401. The operation of the 'copy operation' node 401 on the 'Z image' representation 409 generates an image instance for the 'C image' representation 411. This image instance is represented by the 'first C image' op-queue entry 419. The 'first C image' op-queue entry 419 indicates that the 'C image' representation 411 is dependent on the 'copy operation' node 401 by containing a reference to the 'copy operation' node 401 in the 'creation operation' field of the 'first C image' op-queue entry 419. The 'addition operation' node 403 describes an addition of the data represented by the 'A image' representation 405 to the data represented by the 'B image' representation 407 to create data that is represented by a second image instance of the 'C image' representation 411. This second image instance is specified by the 'second C image' op-queue entry 421. The same or different areas of the 'C image' representation 411 can be operated on by the 'addition operation' node 403 and the 'copy operation' node 401. Thus, the op-queue pointed to by the 'C image' representation 411 indicates the sequence of operations that are applied to the 'C image' representation 411 and what those operations are. One skilled in the art will understand that if the area of the 'C image' representation 411 operated on by the 'addition operation' node 403 completely replaces the area of the 'C image' representation 411 operated on by the 'copy operation' node 401 that the 'copy operation' node 401 portion of the DAG 400 can be destroyed as it is no longer necessary. The 'A image' representation op-queue entry 413 and the 'B image' op-queue entry 415 both indicate that these image instances are operated on by the 'addition operation' node 403 because the dependency list for each image representation contains a pointer to the 'addition operation' node 403.

Figure 4B:
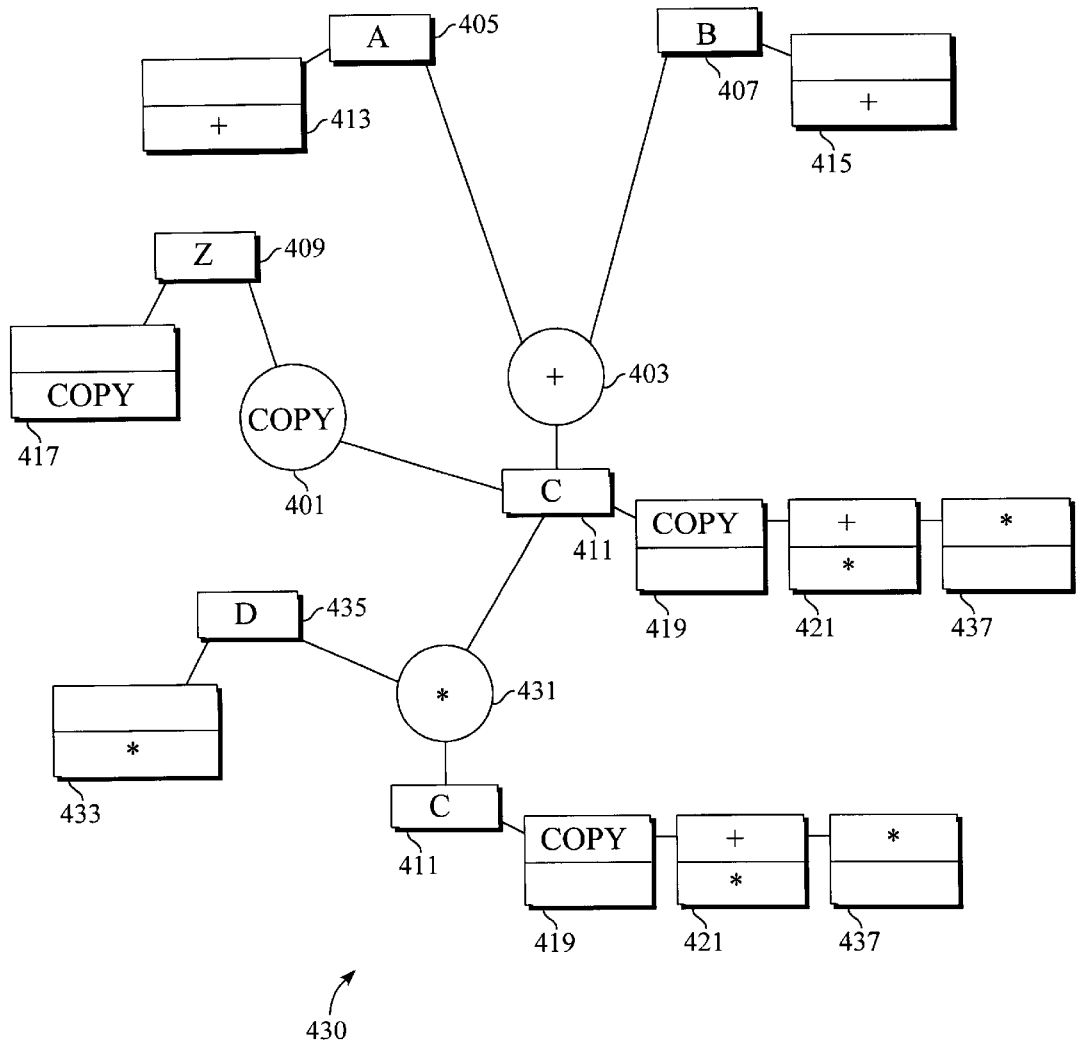
FIG. 4B illustrates a first modified DAG structure in accordance with a preferred embodiment.

FIG. 4B illustrates a first modified DAG structure 430 that is the result of the capture of a multiply operation on the 'C image' representation 411 as applied to the DAG 400 of FIG. 4A. Thus, the first modified DAG structure 430 now includes a 'multiply operation' node 431 that operates on an image instance represented by the 'second C image' op-queue entry 421 of the 'C image' representation 411 and an image instance represented by a 'D image' op-queue entry 433 of a 'D image' representation 435 to produce a 'third C image' op-queue entry 437 of the 'C image' representation 411. FIG. 4B shows that as additional operations are captured and added to the DAG the data structure continues to expand while maintaining the sequence of operations that are to be applied to create a realized image. The op-queue entries allow the data structure to maintain a history of operations applied to the image representation that represent image instances of the image representation. Thus, even though multiple operations are applied to the 'C image' representation 411, each image instance can be separately realized. It is important to realize that the multiple occurrences of the 'C image' representation 411 in FIG. 4B are exactly the same image representation—and the image data represented by the image representation is also exactly the same. Further the identically referenced op-queue entries are also the same.

Figure 4C:
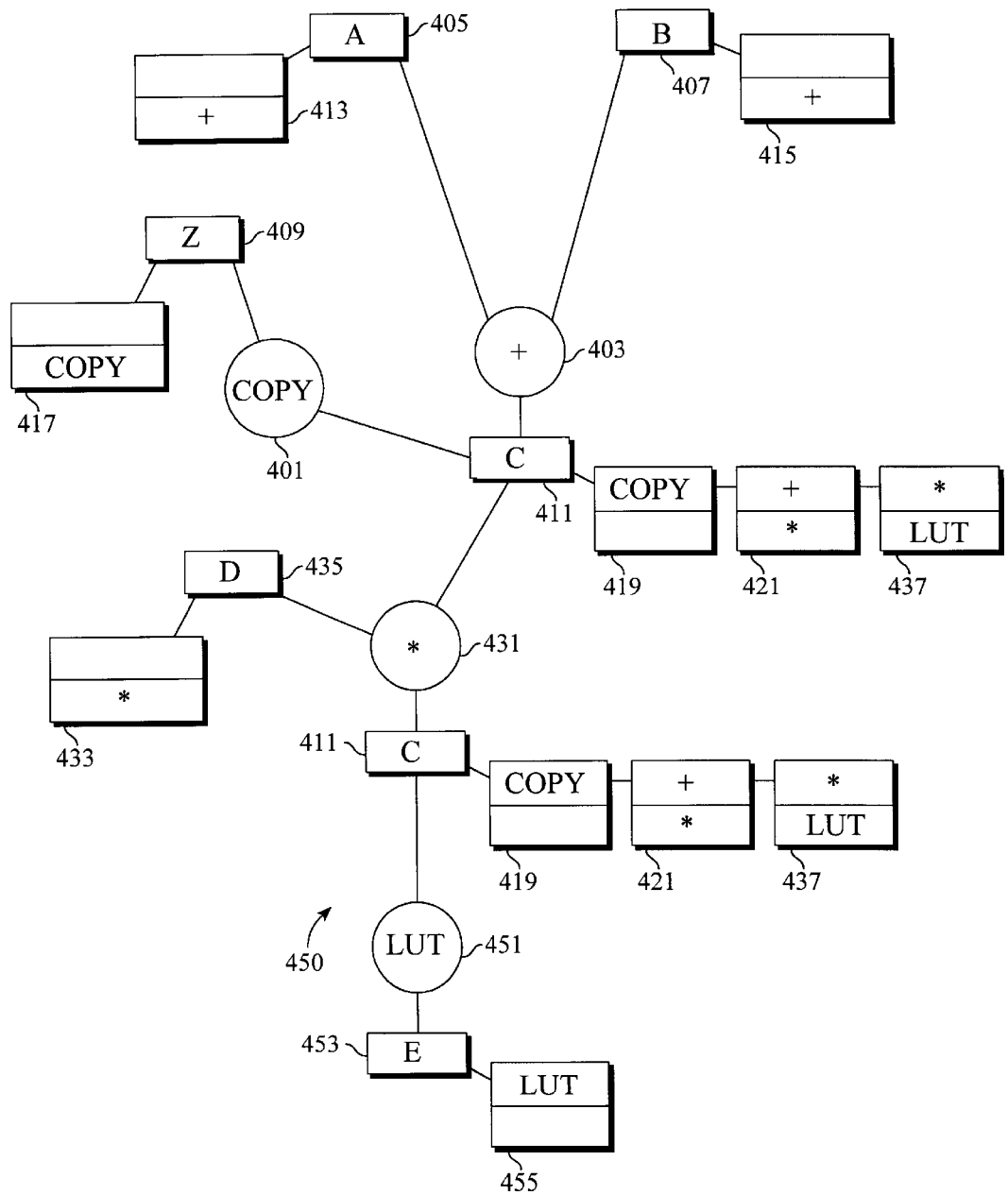
FIG. 4C illustrates a completed DAG structure in accordance with a preferred embodiment.

FIG. 4C illustrates a completed DAG structure 450 that results after addition of a 'LUT operation' node 451 to the first modified DAG structure 430. The LUT operation generates an 'E image' representation 453 along with an 'E image' op-queue entry 455. Assuming that the capture of the LUT operation is a result producing imaging operation (possibly triggered by a result producing event) the completed DAG structure 450 can be analyzed. Thus, as the LUT represented by the 'LUT operation' node 451 is executed on the image instance defined by the 'third C image' op-queue entry 437, it first determines the destination tiles that will be affected by the operation (as subsequently described). Then the LUT operation is applied to each of the determined tiles as is described with respect to FIG. 5 through FIG. 11. The data structure allows a backward flow analysis similar to that used in compilers to determine which realized tile(s) of the source image(s) are needed to generate a tile for the realized destination image.

One skilled in the art will understand that the DAG of FIG. 4C has been modified (as compared to a DAG used for compiler optimizations) to represent three different image instances of the 'C image' representation 411. The first instance being the result of the 'copy operation' node 401 to the 'C image' representation 411, the second instance being the result of the 'addition operation' node 403, and the third a result of the 'multiply operation' node 431. Thus, the backward analysis performed on the 'E image' representation 453 determines which tiles are used from the 'A image' representation 405, the 'B image' representation 407, and the 'Z image' representation 409 to create realized image instance represented by the 'third C image' op-queue entry 437.

As is subsequently described, a backwards analysis can be performed on the previously described DAGs to determine the source image's target tiles that will be operated on by the deferred operations represented by the DAG. Once the source's target tile is determined, the deferred sequence of imaging operations are sequentially applied to the target tile to realize the image data contributed to by the source's target tile.

Figure 5:
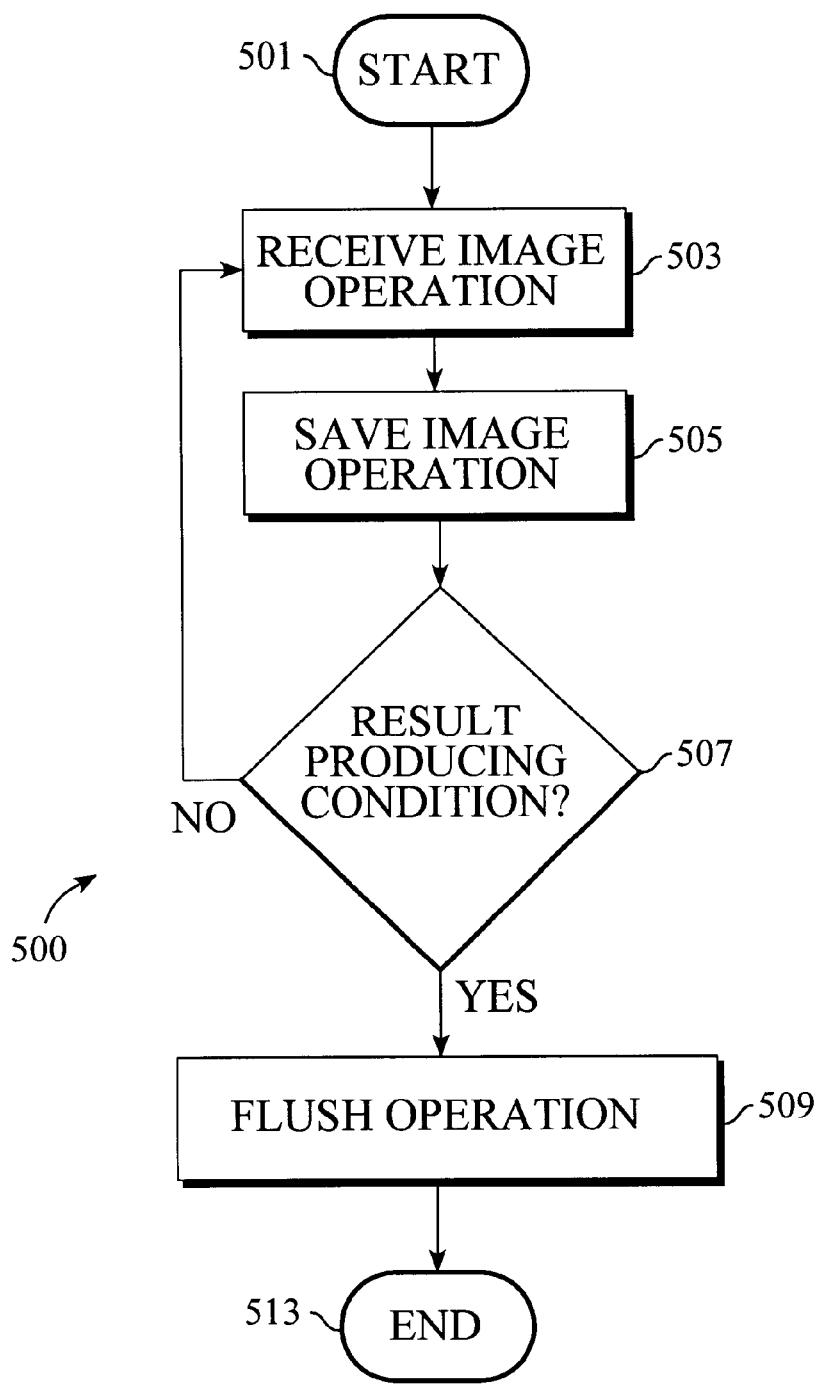
FIG. 5 illustrates a 'deferred image operation' process for modifying a tile in accordance with a preferred embodiment.

FIG. 5 illustrates an image modification process 500 that initiates at a 'start' terminal 501 and continues to a 'receive image operation' procedure 503. The 'receive image operation' procedure 503 intercepts an invocation of an image processing operation. Information about the intercepted image processing operation is then stored in a data structure (such as the previously described DAGs) at a 'save image operation' procedure 505. Those skilled in the art will understand how to construct this data structure by referring to the illustrations and accompanying text for FIG. 3, FIG. 4A through FIG. 4C, and FIG. 6.

Next the process 500 continues to a 'result producing condition' decision procedure 507 that determines whether the captured operation is a "result producing imaging operation" or whether an external condition exists that requires the generation of a realized image (such as an image display request). A result producing imaging operation is one that causes the deferred imaging operations to be applied to the source image(s) to generate a realized destination image. The result producing imaging operation includes capture of particular imaging operations that require that the realized image be generated (such as a histogram operation where results must be analyzed before the application can proceed). The result producing imaging operation also includes conditions that require an image to be created, such as the above mentioned image display request.

If the 'result producing condition' decision procedure 507 determines that a result producing imaging operation has not occurred, the process 500 continues to capture other operations by looping back to the 'receive image operation' procedure 503. Thus, imaging operations are deferred for possible later execution. However, if the 'result producing condition' decision procedure 507 determines that the result producing imaging operation has occurred, the process 500 continues to a 'flush operation' procedure 509 that analyzes the data structure to determine which tile(s) from the source image(s) are to be operated on to generate the realized destination image. The 'flush operation' procedure 509 also applies the deferred operations to those tiles to generate the realized destination image. The 'flush operation' procedure 509 is subsequently described with respect to FIG. 7.

Figure 6:
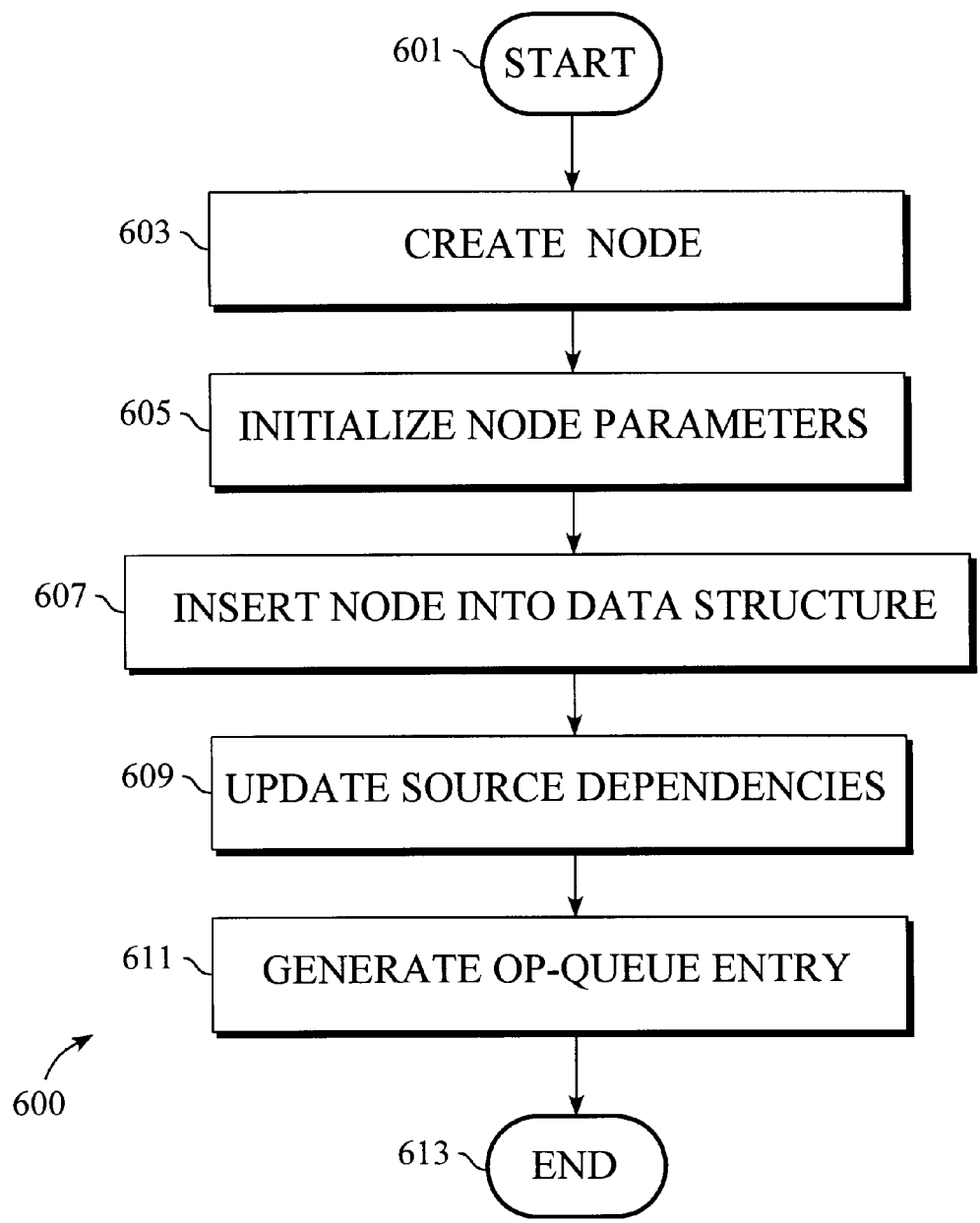
FIG. 6 illustrates a 'save operation in data structure' process in accordance with a preferred embodiment.

FIG. 6 illustrates a 'save operation in data structure' process 600 that is invoked by the 'save image operation' procedure 505 and that inserts information about the captured image operation in the DAG. The process 600 initiates at a 'start' terminal 601 and continues to a 'create node' procedure 603 that creates a node for insertion into the data structure. Next, an 'initialize node parameters' procedure 605 initializes the node to represent the captured imaging operation. This initialization includes creating a "destination image representation" (if one does not already exist) for the operation represented by the node and linking the destination image representation to the node. Once the node is initialized, it is inserted into the data structure by an 'insert node' procedure 607 using techniques well understood in the art. The 'insert node' procedure 607 links the node to the source image representation(s) used by the node. Next, an 'update source dependencies' procedure 609 updates the dependency list maintained in the 'dependency list' field 303 in op-queue entry owned by the source image representation(s) operated on by the node to make the node dependent on the source image instance. Then, a 'generate op-queue entry' procedure 611 creates and links the image op-queue entry 300 that represents an image instance to the node's destination image representation and initializes the 'creation operation' field 301 to point to the node. The process 600 completes through an 'end' terminal 613. In this manner, a data structure is created that represents multiple image operations that are to be applied to one or more tiles of one or more source images. One skilled in the art will understand that the op-queue belonging to the source image representation is initialized to have an initial image instance if no image instance exists in the source image representation.

Figure 7:
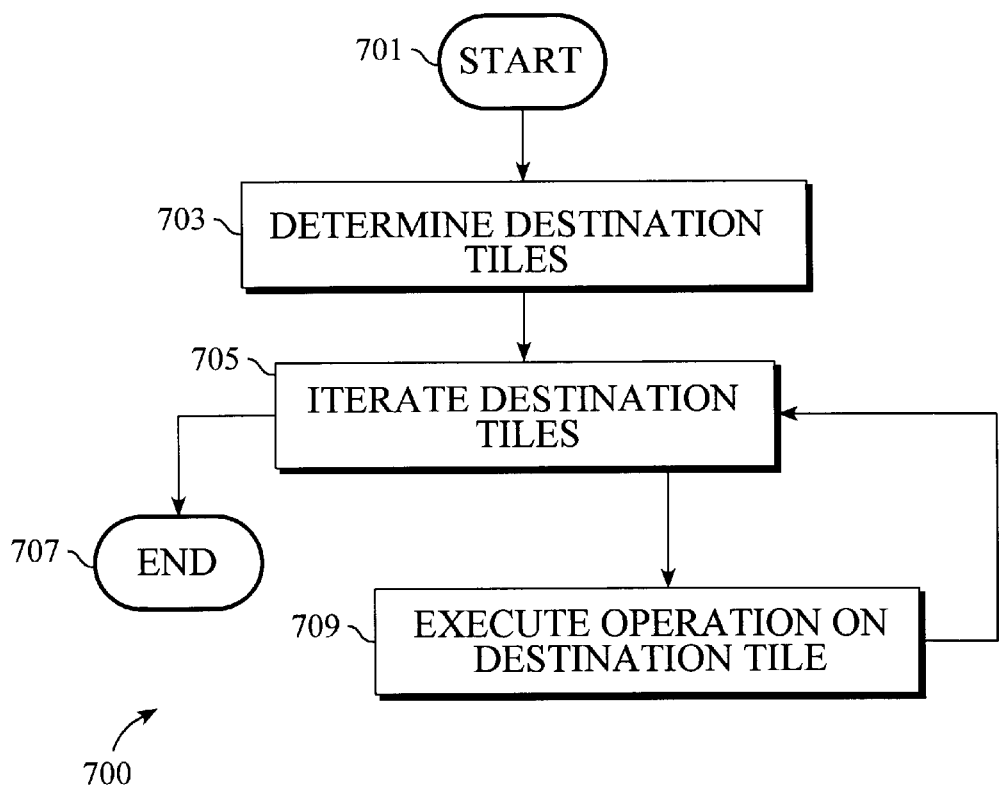
FIG. 7 illustrates a 'flush operation' process in accordance with a preferred embodiment.

FIG. 7 illustrates a 'flush operation' process 700 that is performed for the node's intermediate destination image. The 'flush operation' process 700 is invoked by the 'flush operation' procedure 509 and is also recursively called, as is subsequently described, in the process illustrated by FIG. 11. The 'flush operation' process 700 initiates at a 'start' terminal 701 and continues to a 'determine destination tiles' procedure 703. The 'determine destination tiles' procedure 703 determines which tile(s), represented by the node's destination image representation, are to be generated by the node's operation. These tiles are then iterated by an 'iterate destination tiles' procedure 705. Once these tiles are iterated, the 'flush operation' process 700 completes through an 'end' terminal 707. An 'execute operation on destination tile' procedure 709, subsequently described, is performed on each iterated tile to generate the realized tile in the node's destination intermediate image.

Figure 8:
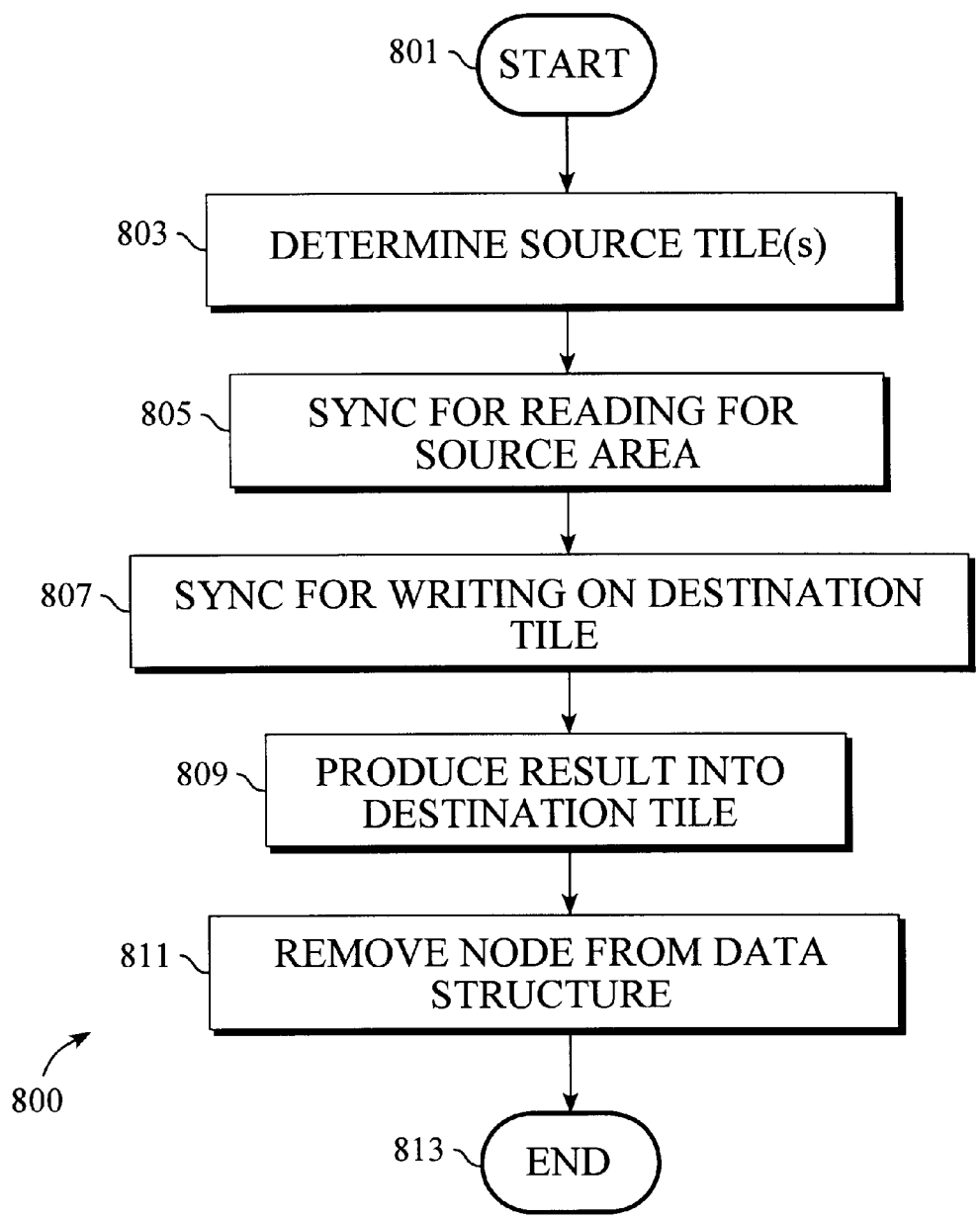
FIG. 8 illustrates an 'execute operation on destination tile' process in accordance with a preferred embodiment.

FIG. 8 illustrates an 'execute operation on destination tile' process 800 invoked by the 'execute operation on destination tile' procedure 709 of FIG. 7 and, as is subsequently described, by the process illustrated by FIG. 10. The 'execute operation on destination tile' process 800 initiates at a 'start' terminal 801 and continues to a 'determine source tiles' procedure 803. This procedure determines the source image representation(s) immediately previous to the node and invokes a procedure that returns the source tiles (from the intermediate source image) operated on by the node to generate a destination tile for the node's intermediate destination image. Next, a 'sync for read on source area' procedure 805, subsequently described (with respect to FIG. 9), assures that the source tiles (from the node's intermediate source image) used by the operation represented by the node have been realized. A source tile is realized when it has had all relevant, and previous, operations applied to the tile and that the image data for the source tile is available and in memory.

Next, a 'sync for write on destination tile' procedure 807, subsequently described with respect to FIG. 11, assures that the node's destination tile has been operated on by all operations that are to be applied prior to the operation represented by the current node. Thus, the 'sync for write on destination tile' procedure 807 assures that the destination tile contains the correct image data prior to being operated on by the current node. Next a 'produce result into destination tile' procedure 809 actually applies the node's operation to the tile(s) from the node's source image(s) to generate a realized tile for the node's destination image. Then, a 'remove node from data structure' procedure 811 determines whether all the required tiles have been processed and if so removes (destroys) the current node from the DAG as the image representation has been fully realized and no longer needs to be described by the DAG. Finally, the 'execute operation on destination tile' process 800 completes through an 'end' terminal 813.

One skilled in the art will understand that the 'sync for read on source area' procedure 805 and the 'sync for write on destination tile' procedure 807 respectively refer to the appropriate op-queue entry (image instance) attached to the image representation.

Figure 9:
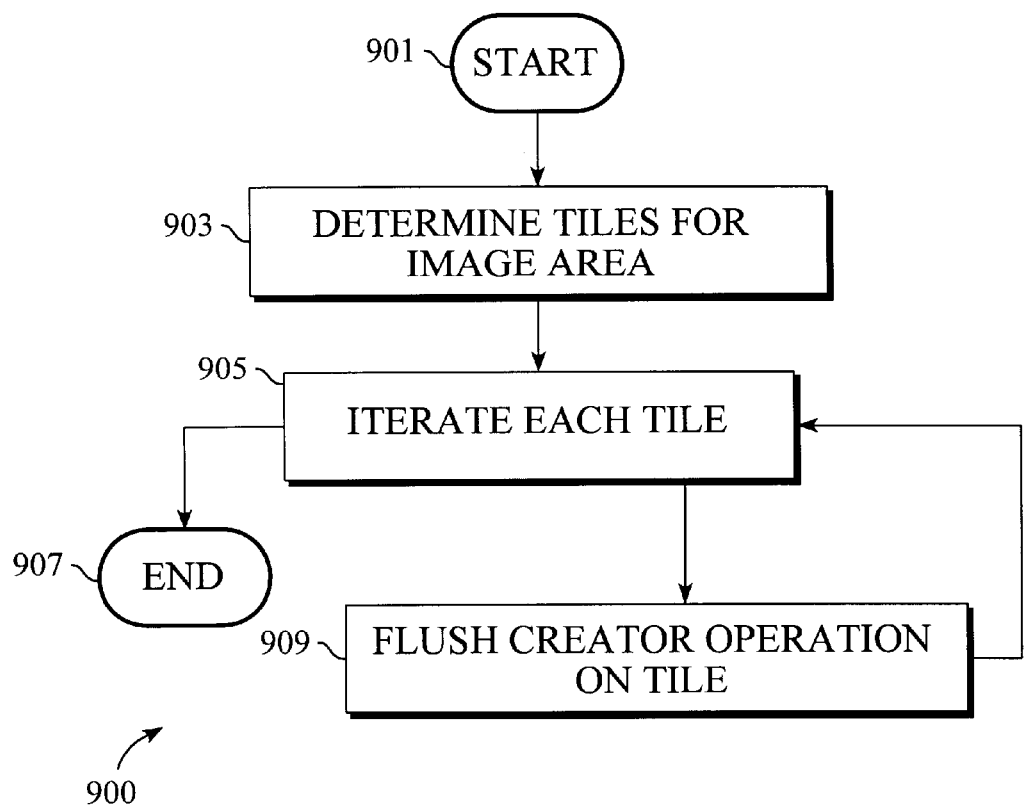
FIG. 9 illustrates a 'synchronize for reading' process in accordance with a preferred embodiment.

FIG. 9 illustrates a 'synchronize for reading' process 900 that synchronizes the source image tile(s) used by the current node. The 'synchronize for reading' process 900 assures that the tile(s) of the node's intermediate source image(s) contains valid image data. It is invoked by the 'sync for read on source area' procedure 805. The 'synchronize for reading' process 900 initiates at a 'start' terminal 901 and continues to a 'determine tiles for image area' procedure 903. This procedure determines which tile(s) of the current node's source image(s) are used by the node's operation. Then, an 'iterate tile' procedure 905 iterates these tiles. Once each determined tile is iterated, the 'synchronize for reading' process 900 completes through an 'end' procedure 907. Each iterated tile is processed by a 'flush creator operation on tile' procedure 909 that is described with respect to FIG. 10.

Figure 10:
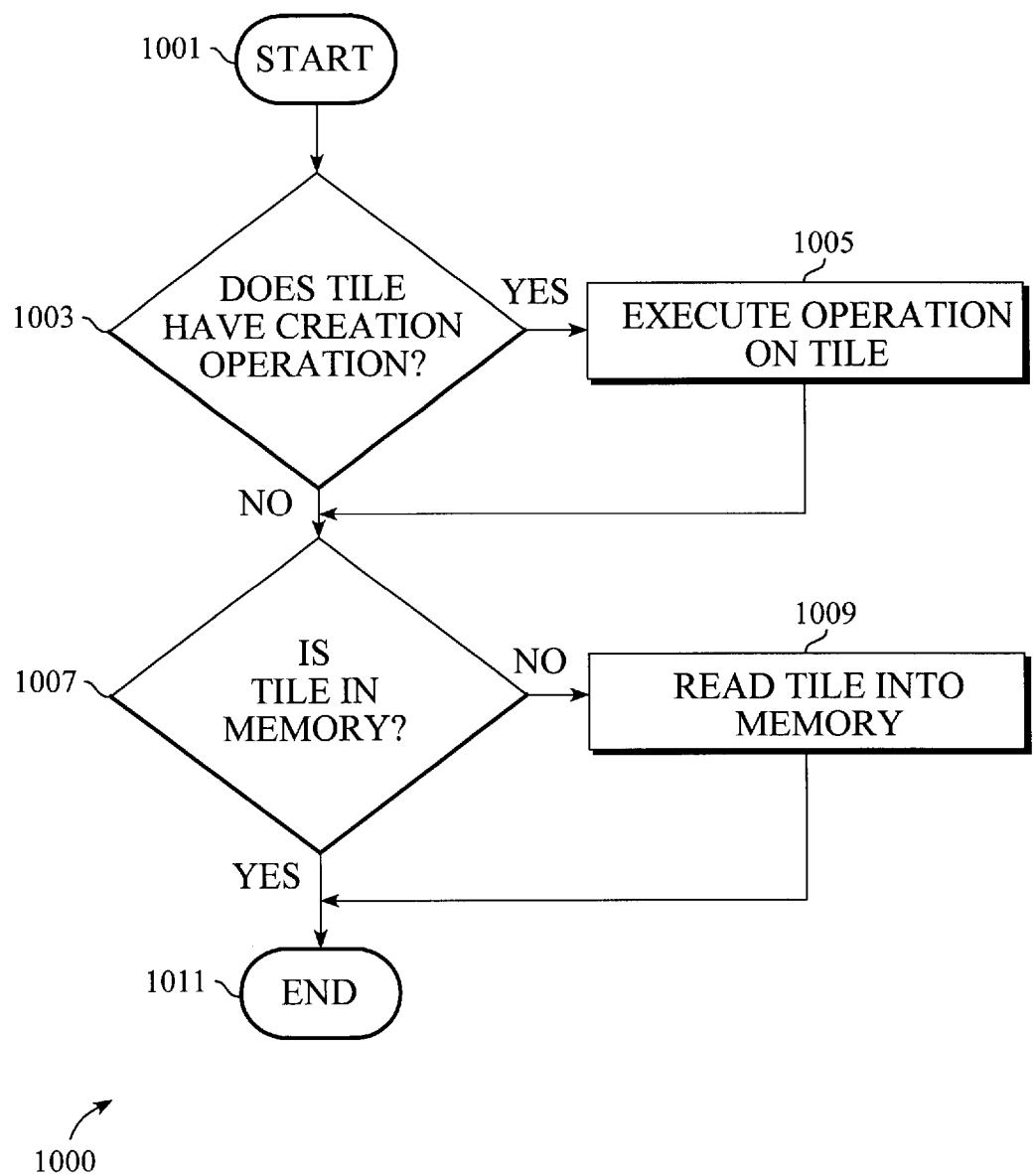
FIG. 10 illustrates a 'flush creator operation on tile' process in accordance with a preferred embodiment.

FIG. 10 illustrates a 'flush creator operation on tile' process 1000 that is invoked by the 'flush creator operation on tile' procedure 909 shown in FIG. 9. The 'flush creator operation on tile' process 1000 recursively invokes the 'execute operation on destination tile' process 800 of FIG. 8 to execute the operation indicated in the 'creation operation' field 301 of the image op-queue entry 300 until a tile is read into memory. The 'flush creator operation on tile' process 1000 initiates at a 'start' terminal 1001 and continues to a 'does tile have creation operation' decision procedure 1003 that examines the op-queue entry for the source image instance being operated on by the node. If the op-queue entry representing the image instance contains a pointer to a node that is used to create the image instance in the 'creation operation' field 301 of the op-queue entry, the 'flush creator operation on tile' process 1000 recursively invokes an 'execute operation on tile' procedure 1005 that in turn invokes the 'execute operation on destination tile' process 800. However, if the op-queue entry representing the image instance is empty, the 'flush creator operation on tile' process 1000 continues to a 'tile in memory' decision procedure 1007 that determines whether the tile being operated on is in memory. If the tile is not in memory, the tile is a target tile belonging to a source image and the target tile is read into memory by a 'read target tile into memory' procedure 1009. Then the 'flush creator operation on tile' process 1000 completes through an 'end' terminal 1011. If the tile is already in memory at the 'tile in memory' decision procedure 1007 the 'flush creator operation on tile' process 1000 completes through the 'end' terminal 1011.

Figure 11:
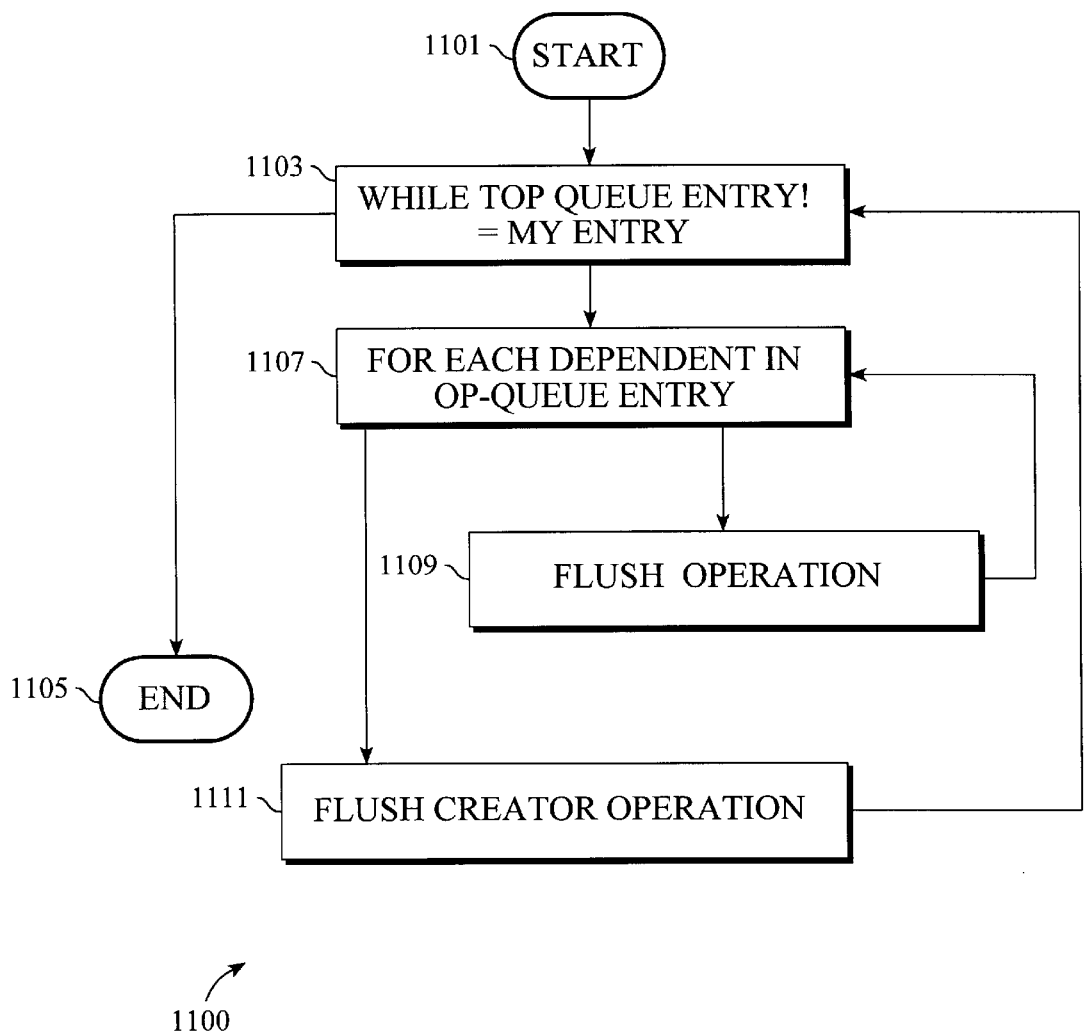
FIG. 11 illustrates a 'synchronize for write' process in accordance with a preferred embodiment.

FIG. 11 illustrates a 'synchronize for write' process 1100 that is invoked from the 'sync for write on destination tile' procedure 807 of FIG. 8. The 'synchronize for write' process 1100 assures that all operations that must be applied to the intermediate destination tile are applied prior to the current operation. The 'synchronize for write' process 1100 initiates at a 'start' terminal 1101 and continues to an 'iterate previous op-queue entries' procedure 1103 that processes each op-queue entry in the destination image representation's op-queue prior to the current op-queue entry. Once the current op-queue entry is reached, the 'synchronize for write' process 1100 completes through an 'end' terminal 1105 leaving the current op-queue entry ready to be processed. Each op-queue entry preceding the current op-queue entry is processed by an 'iterate each dependent in op-queue entry' procedure 1107 that iterates each entry in the 'dependency list' field 303. Each entry in the 'dependency list' field 303 points to a node that is dependent on this destination image representation. The 'iterate each dependent in op-queue entry' procedure 1107 iterates over these entries and invokes a 'flush operation' procedure 1109 on the node. The 'flush operation' procedure 1109 was previously described with respect to FIG. 7. After each dependent operation in the op-queue entry has been flushed, the 'synchronize for write' process 1100 continues to a 'flush creator operation on tile' procedure 1111 that recursively executes operations on image representations to create intermediate images as is illustrated in FIG. 10.

In a preferred embodiment, the 'flush creator operation on tile' procedure 909 and the 'flush creator operation on tile' procedure 1111 are the same and can be recursively called. Similarly, the 'flush operation' procedure 509 and the 'flush operation' procedure 1109 are the same and also can be recursively called.

One skilled in the art will understand that the invention as previously described teaches a method, system, apparatus, and programming product that reduces the number of disk accesses required to apply a sequence of deferred imaging operations a tiled image.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A method for processing an image comprising a plurality of tiles in a memory in a computer comprising:

analyzing a directed acyclic graph to determine a tile that will be a target of an imaging operation, said analyzing performed by a computer;

moving said tile of said plurality of tiles from file storage area to said memory, only when required;

performing a plurality of imaging operations on said plurality of tiles while it is in said memory to produce a modified plurality of tiles; and replacing said plurality of tiles with said modified plurality of tiles in said file storage area.

2. The method of claim 1 wherein said imaging operations are deferred until data is required.

3. The method of claim 2 wherein said imaging operations are applied to only those tiles of the source image that are required to produce a final outcome.

4. The method of claim 3 further comprising:

creating a data structure to represent said tiles and said imaging operations.

5. The method of claim 4 further comprising:

using said data structure to determine when said plurality of tiles should be moved from said file storage area to said memory.

6. The method of claim 5 wherein said data structure is a graph.

7. The method of claim 6 wherein said graph is a directed acyclical graph.

8. An image processor for an image comprising a plurality of tiles in a memory in a computer comprising:

a determiner identifying a source image tile that will be a target of an imaging operation, wherein said source image tile of said plurality of tiles is moved from file storage area to said memory, only when required;

a plurality of imaging operations configured to be performed on said plurality of tiles while it is in said memory to produce a modified plurality of tiles; and a mover configured to replace said plurality of tiles with said modified plurality of tiles in said file storage area.

9. The image processor of claim 8 wherein said imaging operations are deferred until data is required.

10. The image processor of claim 9 wherein said imaging operations are applied to only those tiles of the source image that are required to produce a final outcome.

11. The image processor of claim 10 further comprising:
a data structure configured to represent said tiles and said imaging operations.

12. The image processor of claim 11 further comprising:
an operator configured to use said data structure to determine when said plurality of tiles should be moved from said file storage area to said memory.

13. The image processor of claim 12 wherein said data structure is a graph.

14. The image processor of claim 13 wherein said graph a directed acyclical graph.

15. A computer program product comprising:
a computer usable medium having computer readable program code embodied therein configured to process an image comprising of a plurality of tiles in a memory in a computer, said computer program product comprising:
computer readable code configured to cause a computer to analyze a directed acyclic graph to determine a tile that will be a target of an imaging operation;
computer readable code configured to cause a computer to move said tile of said plurality of tiles from file storage area to said memory, only when required;
computer readable code configured to cause a computer to perform a plurality of imaging operations on said plurality of tiles while it is in said memory to produce a modified plurality of files; and
computer readable code configured to cause a computer to replace said plurality of files with said modified plurality of tiles in said file storage area.

16. The computer program product of claim 15 wherein said imaging operations are deferred until data is required.

17. The computer program product of claim 16 wherein said imaging operations are applied to only those tiles of the source image that are required to produce a final outcome.

18. The computer program product method of claim 17 further comprising:
computer readable code configured to cause a computer to create a data structure to represent said tiles and said imaging operations.

19. The computer program product of claim 18 further comprising:
computer readable code configured to cause a computer to use said data structure to determine when said plurality of tiles should be moved from said file storage area to said memory.

20. The computer program product of claim 19 wherein said data structure is a graph.

21. The computer program product of claim 20 wherein said graph is a directed acyclical graph.

* * * * *

UNITED STATES PATENT AND TRADEMARK OFFICE
CERTIFICATE OF CORRECTION

| | | |
|---|---|---|
| PATENT NO. | : 6,741,255 B1 | Page 1 of 1 |
| APPLICATION NO. | : 08/911091 | |
| DATED | : May 25, 2004 | |
| INVENTOR(S) | : Furlani et al. | |

It is certified that error appears in the above-identified patent and that said Letters Patent is hereby corrected as shown below:

In the Claims:

Claim 15, col. 14, line 4, please delete "files:" and insert --tiles-- in place thereof.

Signed and Sealed this

Thirteenth Day of February, 2007

JON W. DUDAS
*Director of the United States Patent and Trademark Office*